(12) United States Patent
Pechenik et al.

(10) Patent No.: US 8,617,456 B1
(45) Date of Patent: Dec. 31, 2013

(54) BULK LOW-COST INTERFACE-DEFINED LAMINATED MATERIALS AND THEIR METHOD OF FABRICATION

(75) Inventors: Alexander Pechenik, Getzville, NY (US); Wesley P. Hoffman, Palmdale, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 358 days.

(21) Appl. No.: 12/980,831

(22) Filed: Dec. 29, 2010

Related U.S. Application Data

(63) Continuation-in-part of application No. 12/728,293, filed on Mar. 22, 2010.

(51) Int. Cl.
*B28B 1/30* (2006.01)

(52) U.S. Cl.
USPC .......................................... 264/650; 264/639

(58) Field of Classification Search
USPC ................................................ 264/639, 650
See application file for complete search history.

(56) References Cited

U.S. PATENT DOCUMENTS

| | | | |
|---|---|---|---|
| 4,483,785 A | 11/1984 | Johnson et al. | |
| 4,615,735 A | 10/1986 | Ping | |
| 4,627,892 A | 12/1986 | Worrell et al. | |
| 4,786,374 A | 11/1988 | Worrell et al. | |
| 4,915,605 A | 4/1990 | Chan et al. | |
| 4,943,320 A | 7/1990 | Pechnik et al. | |
| 5,204,055 A | 4/1993 | Sachs et al. | |
| 5,217,822 A | 6/1993 | Yoshida et al. | |
| 5,234,641 A * | 8/1993 | Rutt | 264/617 |
| 5,266,419 A | 11/1993 | Yamada | |
| 5,387,299 A * | 2/1995 | Singh et al. | 156/89.26 |
| 5,397,450 A | 3/1995 | Sekhar et al. | |
| 5,453,330 A | 9/1995 | Kawasaki et al. | |
| 5,509,978 A | 4/1996 | Masumoto et al. | |
| 5,561,829 A | 10/1996 | Sawtell et al. | |
| 5,687,679 A | 11/1997 | Mullin et al. | |
| 5,779,833 A * | 7/1998 | Cawley et al. | 156/89.11 |
| 5,788,738 A | 8/1998 | Pirzada et al. | |
| 5,984,997 A | 11/1999 | Bickmore et al. | |
| 5,997,800 A * | 12/1999 | Wimberger Friedl et al. | 264/603 |
| 6,020,419 A | 2/2000 | Bock et al. | |
| 6,048,577 A | 4/2000 | Garg | |
| 6,203,768 B1 | 3/2001 | McCormick et al. | |
| 6,207,038 B1 | 3/2001 | Steil et al. | |
| 6,312,643 B1 | 11/2001 | Upadhya et al. | |
| 6,410,160 B1 | 6/2002 | Landin et al. | |
| 6,447,712 B1 * | 9/2002 | Dogan et al. | 264/608 |
| 6,656,336 B2 | 12/2003 | Mukundan et al. | |
| 6,682,598 B1 * | 1/2004 | Steinmueller et al. | 118/58 |
| 6,709,628 B2 | 3/2004 | Kleinlogel et al. | |
| 6,787,080 B1 | 9/2004 | Lange et al. | |
| 6,800,158 B2 | 10/2004 | Polikarpus et al. | |
| 6,811,741 B2 * | 11/2004 | Pham et al. | 264/642 |
| 6,861,155 B2 | 3/2005 | Bawendi et al. | |
| 6,866,957 B1 | 3/2005 | Bagger et al. | |
| 6,908,568 B2 * | 6/2005 | Masuzawa et al. | 252/62.56 |
| 6,930,059 B2 | 8/2005 | Conley et al. | |
| 7,029,777 B2 | 4/2006 | Mardilovich | |
| 7,128,995 B2 | 10/2006 | Higuchi et al. | |
| 7,131,174 B2 * | 11/2006 | Kobayashi et al. | 29/25.42 |
| 7,186,368 B2 | 3/2007 | Simwonis et al. | |
| 7,214,333 B2 | 5/2007 | Mukundan et al. | |
| 7,438,837 B2 | 10/2008 | Hatano et al. | |
| 7,527,761 B2 | 5/2009 | Swartzlander et al. | |
| 7,595,127 B2 | 9/2009 | Seabaugh et al. | |
| 7,713,592 B2 | 5/2010 | Nguyen et al. | |
| 7,833,469 B2 | 11/2010 | Swartzlander et al. | |
| 7,947,212 B2 | 5/2011 | Steele et al. | |
| 8,197,885 B2 | 6/2012 | Honecker et al. | |
| 2002/0108854 A1 | 8/2002 | Labarge et al. | |
| 2002/0146611 A1 | 10/2002 | Kawasaki et al. | |
| 2002/0185376 A1 | 12/2002 | Mukundan et al. | |
| 2003/0027027 A1 | 2/2003 | Cutler et al. | |
| 2003/0027033 A1 | 2/2003 | Seabaugh et al. | |
| 2003/0090027 A1 | 5/2003 | Smirnova et al. | |
| 2003/0148160 A1 | 8/2003 | Song et al. | |
| 2003/0165726 A1 | 9/2003 | Robert et al. | |

(Continued)

OTHER PUBLICATIONS

Garcia-Barriocanal, et al., "Colossal Ionic Conductivity at Interfaces of Epitaxial $ZrO_2:Y_2O_3/SrTiO_3$ Heterostructures", *Science* 321, 676 (2008).

(Continued)

*Primary Examiner* — Joseph S Del Sole
*Assistant Examiner* — Russell Kemmerle, III
(74) *Attorney, Agent, or Firm* — AFMCLO/JAZ; Rebecca Greendyke

(57) ABSTRACT

This invention describes a novel type of materials named by the inventors as Interface-Defined nano-Laminates (IDnL), and a new method for fabricating these materials from ceramic, metallic, and other powders. The laminate layer thickness in IDnL is smaller than that of ordinary laminates, but greater than that of superlattices. IDnL are fundamentally different from ordinary laminates in that their properties are defined by interfaces, and not by the properties of the bulk materials comprising individual layers. In contrast to superlattice materials, IDnL can be made thermally stable, due to the wide selection of interface-defining materials, which allows judicial use of equilibrium phase diagrams, and the "entropic stabilization" approach discovered by the authors; and in addition IDnL can be manufactured inexpensively in bulk, industrial quantities and large sizes by the techniques revealed in this invention. The degree of interface coherency in an IDnLs can be varied to optimize material properties.

20 Claims, No Drawings

(56) References Cited

U.S. PATENT DOCUMENTS

| | | | |
|---|---|---|---|
| 2003/0224234 | A1 | 12/2003 | Steele et al. |
| 2004/0033886 | A1 | 2/2004 | Simwonis et al. |
| 2004/0104519 | A1 | 6/2004 | Chen et al. |
| 2004/0202919 | A1 | 10/2004 | Mardilovich et al. |
| 2004/0265483 | A1 | 12/2004 | Meyer et al. |
| 2005/0082726 | A1* | 4/2005 | Hilmas et al. ............... 264/612 |
| 2005/0095495 | A1 | 5/2005 | Yamada et al. |
| 2005/0095497 | A1 | 5/2005 | Yamada et al. |
| 2005/0275143 | A1 | 12/2005 | Toth |
| 2006/0049540 | A1* | 3/2006 | Hui et al. .................... 264/140 |
| 2006/0125157 | A1 | 6/2006 | Swartzlander et al. |
| 2007/0026285 | A1 | 2/2007 | Wang et al. |
| 2007/0077476 | A1 | 4/2007 | Lee et al. |
| 2007/0117006 | A1 | 5/2007 | Zhan et al. |
| 2007/0176332 | A1 | 8/2007 | Swartzlander et al. |
| 2007/0179040 | A1 | 8/2007 | Li et al. |
| 2007/0273070 | A1* | 11/2007 | Badding et al. .............. 264/618 |
| 2009/0188789 | A1 | 7/2009 | Honecker et al. |
| 2010/0028757 | A1 | 2/2010 | Fu et al. |
| 2010/0126807 | A1 | 5/2010 | Liao et al. |
| 2010/0159356 | A1 | 6/2010 | Mahoney |
| 2010/0167170 | A1 | 7/2010 | Narendar et al. |
| 2010/0200427 | A1 | 8/2010 | Koike et al. |
| 2010/0292522 | A1 | 11/2010 | Chun et al. |
| 2011/0236743 | A1 | 9/2011 | Kumar et al. |
| 2012/0009507 | A1 | 1/2012 | Wood et al. |
| 2012/0049132 | A1 | 3/2012 | Marlin et al. |
| 2012/0094214 | A1 | 4/2012 | Zahid et al. |
| 2012/0141916 | A1 | 6/2012 | Robert et al. |

OTHER PUBLICATIONS

Berkowitz et. al , "Establishing exchange bias below $T_N$ with polycrystalline $Ni_{0.52}Co_{0.48}$Q/Co bilayers", *Phys. Rev.* B 72, 134428 (2005).

Zhang et. el , "Coercivity Induced by Random-Field at Ferromagnetic and Antiferromagnetic Interfaces," *J. Mag. Mag. Mater.* 198-199, 468 (1999).

O'Handley et. al. , "Phenomenology of Giant Magnetic-Field induced Strain in Ferromagnetic Shape Memory Materials", *J. Appl. Phys.* 87, 4712 (2000).

Gozar, , "High-temperature interface superconductivity between metallic and insulating copper oxides", *Nature* 455, 782-785 (Oct. 9, 2008).

United States Patent and Trademark Office, Advisory Action in related U.S. Appl. No. 12/152,128, mailed on Jun. 5, 2012, 2 pages.

United States Patent and Trademark Office, Final Office in related U.S. Appl. No. 12/152,128, mailed on Mar. 12, 2012, 24 pages.

United States Patent and Trademark Office, Non-Final Office Action in related U.S. Appl. No. 12/152,128, mailed on May 19, 2011, 14 pages.

United States Patent and Trademark Office, Final Office Action in related U.S. Appl. No. 12/938,463, mailed on Feb. 15, 2013, 8 pages.

United States Patent and Trademark Office, Non-Final Office Action in related U.S. Appl. No. 12/938,463, mailed on Aug. 1, 2012, 20 pages.

L. Armelao et al., "Zirconium and hafnium oxoclusters as molecular building blocks for highly dispersed $ZrO_2$ or $HfO_2$ nanoparticles in silica thin films," J. Mat. Chem., vol. 15 (2005) 1838-1848.

Z. Q. Jin et al., "Shock compaction of bulk nanocomposite magnetic materials," Mat. Sci. Forum., vol. 465-466 (2004) 93-100.

T. G. Neih et al., "Dynamic compaction of aluminum nanocrystals," Acta Mater., vol. 44 (1996) 3781-3788.

Bargeron, C.B., et al., "Oxidation of Hafnium Carbide in the Temperature Range 1400° to 2060°C," J Amer Ceram Soc, Jan. 1993; 76(4):1040-1046. DOI:10.1111/j.1151-2916.1993.tb05332.x Jia, K., et al, "Abrasion resistance of nanostructured and conventional cemented carbides," Wear, vol. 200, Issues 1-2, Dec. 1, 1996, pp. 206-214.

Wang, Y., et al, "Abrasive wear characteristics of plasma sprayed nanostructured alumina/titania coatings," Wear, vol. 237, Issue 2, Feb. 2000, pp. 176-185.

Sundararajan, T., et al., "High temperature corrosion of nanoceria coated 9Cr-1Mo ferritic steel in air and steam," Surface and Coatings Technology, vol. 201, Issue 6, Dec. 4, 2006, pp. 2124-2130.

Costescu, R.M., et al., "Ultra-Low Thermal Conductivity in $W/Al2O3$ Nanolaminates," Science Feb. 13, 2004, vol. 303 No. 5660 pp. 989-990, DOI: 10.1126/science.1093711.

United States Patent and Trademark Office, Non-Final Office Action in related U.S. Appl. No. 12/938,462, mailed on Jul. 16, 2013, 21 pages.

Chen et al., "Novel equipment for the study of compaction of fine powders," J. Amer. Ceramic Soc., vol. 77 (1994) 1005-1010.

I. Kim et al., "Age-hardening associated with grain boundary precipitation in a commercial dental gold alloy," J. Oral Rehab., vol. 26 (1999) 215-222.

M. Suzuki et al., "Synthesis of silicon carbide-silicon nitride composite ultrafine particles using a carbon dioxide laser," J. Am. Ceramic Soc., vol. 76 (1993) 1195-1200.

A. S. Utada et al., "Dripping, jetting, drops, and wetting: the magic of microfluids," MRS Bull., vol. 32 (2007) 702-708.

D. W. Matson et al., "Production of fine powders by the rapid expansion of supercritical fluid solutions (retroactive coverage)," Adv. Ceramics., vol. 21 (1986) 109-120.

\* cited by examiner

BULK LOW-COST INTERFACE-DEFINED LAMINATED MATERIALS AND THEIR METHOD OF FABRICATION

CROSS REFERENCE TO RELATED APPLICATION

This application is a continuation-in-part of and claims priority from U.S. patent application Ser. No. 12/728,293 filed on Mar. 22, 2010.

RIGHTS OF THE GOVERNMENT

The invention described herein may be manufactured and used by or for the Government of the United States for all governmental purposes without the payment of any royalty.

BACKGROUND OF INVENTION

The present invention describes a novel class of materials that fits between the ordinary industrial laminates and research-type nanolaminates or superlattices, in regards to properties and cost. The novel Interface-Defined nano-Laminated materials (IDnL) of this invention differ from both the large-scale laminates and the extremely fine-scale superlattices, due to their unique micro- and nano-structures produced by the novel methods of fabrication, which are also a subject of this invention. In the new IDnL materials, the interfaces between the alternative layers can be designed and fabricated from many different materials. Also, these interfaces have unique properties and structures, which can be varied from nearly coherent to completely incoherent by varying the processing approach. The degree of deviation from perfect coherency at the interfaces potentially can be controlled without much increase in cost of the IDnL materials. Thus, IDnL materials and the novel methods of their preparation potentially can be used in a wide range of industrial applications, from those of the relatively coarse structural laminates, to those of the extremely fine electronic, semiconducting, and optical nanolaminates.

In general, laminates can be made with layers having a wide range of thickness. The terms 'laminated materials', or 'laminates', generally refer to materials that consist of many parallel layers of relatively thick (layer thickness>1 mm) dissimilar materials. Laminates are utilized in many diverse fields, such as food preparation (French and German pastry), penetration-resistant materials (armor, bullet-proof glass), heat shields for satellites (NASA, DOD), as well as tools (metal cutting inserts), and weapons (Japanese samurai swords)—just to name a few.

The properties of laminates, in general, are controlled by two factors, i.e. the properties of the material within the layers and the properties of the interfaces between the layers. When the number of layers is small (in this case a material usually referred to as 'layered'), it is predominately the properties of the materials within the individual layers that define the properties of the whole laminate. However, as the number of layers increases, the properties of the interfaces between the dissimilar layers begin to impose an ever increasing effect on the properties of the laminate. In some applications, it is the properties of the interfaces that are the determining factor in the performance of the whole laminate. For example, a reflecting insulator that consists of a number of metallic layers, each of which is an excellent conductor of heat and is separated from the next reflector by an air gap or vacuum, is, nevertheless, an excellent insulator because of the reflection and scattering of heat perpendicular to the metal/gas interfaces.

Laminates have many industrially-useful properties. The properties of laminates are anisotropic, so they are often called '2-dimensional materials', because their properties in the plane of the layers and perpendicular to that plane are drastically different. For example, heat conductivity in the crystal plane and perpendicular to the crystal planes of pyrolytic graphite can differ by three orders of magnitude; fracturing goes easily along the glass planes in laminated glass, but is quickly arrested in the direction perpendicular to the glass planes; electrical current propagates in planes, but not perpendicular to the planes in metal/oxide laminates utilized in super-capacitors, etc.

The anisotropic properties of laminates can be highly useful in impeding conduction of heat as well as propagation of fracture, or chemical attack. Regardless of the form of the propagating entity, laminate materials usually inhibit propagation of the energy or matter in the direction perpendicular to the layers, while dissipating this energy or matter principally along the surface of the interfaces.

In contrast to the laminates with macroscopic thick layers discussed above are the conventional nanolaminated materials and superlattices that have been researched extensively since the late 1970s. These are extremely finely-layered materials with the thickness of individual layers of the order of 1 to 10 nm. They are also prohibitively expensive for industrial applications (except for some high-tech uses that require very small samples, such as reading heads in magnetic storage). The word 'superlattice' was coined by physicists, who were the early investigators of these materials, to emphasize the existence of extra peaks in X-ray diffraction patterns of these materials. Traditionally, the word 'superlattice' is used with nanolayered materials that have coherent interfaces, i.e. when the lattice planes are continuous from one phase to another across the interface. When the interfaces are incoherent, the material is usually referred to as 'nanolayered'. (In the instant invention, the word 'nanolaminate' will be used for all these types of materials with layers of nanometer thickness up to 999 nanometers.) These nano-laminated materials have been found to have very intriguing and industrially-useful properties. The whole area is still an active research field in Materials Science and Physics. Electronic, magnetic, and mechanical properties of these materials are still actively researched, scientific conferences held, and new applications come out every year. New important properties, such as superior hardness/toughness combination, excellent wear resistance, super-modulus effects, superconductivity, optical waveguide properties, and magnetic properties are active areas of research in conventional nano-laminates.

Presently, despite their attractive properties, from the point of view of industrial and commercial applications, conventional nano-laminates have some very serious drawbacks. That is, to manufacture these materials currently requires very expensive equipment, very clean conditions, and high vacuum, as the nanolaminates are essentially built-up one atom at a time. To date, these materials have been fabricated utilizing magnetron sputtering or atomic layer deposition (ALD). Nanolaminates manufactured by these techniques usually have strongly-attached coherent interfaces, because of the perfection of the deposition and atomic uniformity of the interface. However, the size of these materials is limited, and the cost to make commercial products with these techniques is prohibitive with state-of-the art techniques.

The desired degree of coherency at each interface depends on the application. As stated above, laminate materials usually inhibit propagation of the energy or matter in the direction perpendicular to the layers, while dissipating this energy or matter along the surface of the interfaces. Thus, to inhibit the propagation of energy, such as thermal energy or crack propagation perpendicular to the interfaces, it is desirable to have an incoherent interface between the layers of the laminate because coherent interfaces do not effectively scatter the energy perpendicular to them.

Laminates with coherent interfaces have very useful properties such as conductivity, as well as enhanced bonding and minimum distortion across the interface which leads to applications in ionic conductors, semiconductors and optics as will be described below. While taking advantage of these properties, it is necessary to realize that laminates with coherent interfaces such as metallic superlattices are usually quite brittle.

In addition, coherency at the interfaces leads to poor thermal stability, thus most superlattices are unstable even at room temperatures, and quickly interdiffuse, losing their nanoscopic properties at or just above ambient temperatures. For these reasons, coherency at the interfaces of nanolayered materials is not always a desirable quality and some departure from coherency is often desired to assure stability at elevated temperatures and improved mechanical properties. Such departures from ideal coherency are often induced by raising the temperature of the substrate or the rate of deposition during the magnetron-assisted sputtering of nanolaminates.

Because of the low thermal stability and high cost, conventional nanolaminates are mainly used in high-tech-type industries, where the price of the product justifies the expense of making a material one layer at a time at the 'breath-taking' rate of 1 micron/hour. The fabrication methods currently used for making nanolaminates cannot be scaled-up to industrially meaningful dimensions because they are inherently prohibitively expensive.

Thus, a need exists for an industrially-scalable batch or continuous technique to produce low-cost nanolaminates at a cost of at least an order of magnitude and preferably at least two orders of magnitude lower than is currently possible with the state-of-the-art techniques. In addition, a need exists to be able to produce nanolaminates of much higher areas. That is, a need exists for a process that is able to fabricate a low-porosity nanolaminate material, in which each interface has a cross-sectional area of at least 0.1 square meter, preferably 1 square meter, and most preferably 10 square meters. The instant invention achieves the goal of providing an industrially-scalable methodology for fabricating large-area parts from nanolayered materials, which are already known in scientific research. Moreover, in the process of developing this methodology, the inventors have discovered a new class of nano-layered materials, termed IDnL, which cover the range of layer thickness between ordinary laminates and superlattices, as outlined above. These new materials have micro- and nanostructure very different from that of the two classes of laminated materials discussed above. Because these materials are fabricated from powders, which are eventually densified and consolidated via rapid sintering, hot rolling, dynamic compaction, plastic deformation and such, the new materials have properties different from that of the already known laminated materials.

There are a lot of approaches, methods, and techniques that have been employed for making metal and ceramic laminates. The simplest approaches produce layers at least 100 microns in thickness and involve placing one layer on top of the other, which can be done by dipping in or painting wet slurries as well as by utilizing tapes. Other techniques that are able to deposit layer by layer, one after another, utilize chemical, physical, mechanical, explosive, or high-voltage approaches to deposit material on surfaces. Techniques that can produce micron-thick layers include ink-jet printing, silk-screen printing, plasma spraying, and the use of a Meyer bar or a Doctor blade. The thinnest nanometer-thick layers require the use of techniques, such as, chemical vapor deposition, physical vapor deposition, atomic layer deposition, pulsed laser deposition, electro-deposition, as well as magnetically and electrostatically-assisted sputtering in which layers are built-up one atom at a time. Other techniques, such as electrophoresis have been used to deposit ceramic nano-laminates from aqueous suspensions. All of the above techniques are inherently very slow not only because of the low rate of deposition but also because of the need to move the substrate between deposition stations or to change the precursor between layer depositions, as well as to allow the previous layer to dry or cure before the next layer can be applied.

Although these techniques can produce a nano-laminate material with essentially an unlimited number of layers, they cannot do this on very large samples at a reasonable cost due to precursor cost, equipment cost, or the cost of sequential deposition of thousands of layers of different materials. These techniques are more applicable to fabricating layered coatings. Considering these factors, it would be prohibitively expensive to fabricate bulk parts with at least a square meter in area and 100,000 layers in thickness.

A few methods to make bulk nano-layered materials do exist, however. One such method is used in manufacturing exfoliated graphite, vermiculate, and mica-type thermal insulation. This method utilizes the natural property of these materials to form flakes. The individual flakes whose area varies from sub-micron to hundreds of millimeters are dispersed in a liquid. When the liquid is removed by evaporation, the flakes settle and form a nano-layered material. However, the individual layers in such structures are not continuous or uniform and the thickness cannot be easily controlled. In addition, it is impossible to make multi-component nano-layered materials, i.e. nano-laminates with neighboring layers having different composition or structure, with a nanometer layer thickness employing this technique.

A multiple extrusion step approach has been utilized in the electronics industry for more than 50 years to make nanometer thick layers in Channeltron photo-multiplier tubes. In this process, sacrificial glass rods coated with a different glass are bundled together in a hexagonal array and drawn down to a very small diameter through many drawing steps. After the sacrificial glass is removed, micron sized holes separated by nanometer thick walls formed by the coating remain. A similar process is currently used in superconductor wire processing to make fibers that consist of large number of closely packed cores. In this case, ceramic superconductor wires are assembled in a closely-packed bunch within a copper outer tube and then extruded to ever smaller diameter tubes to make thin wires that consist of thousands of thin electrically-isolated superconducting wires. These approaches are conceptually similar to the current invention, however these approaches are directed towards making single layer 1-dimensional structures—tubes and wires-not 2-dimensional multi-layered bulk materials as in this invention.

To summarize the prior art, no approaches exist in the current state-of-the-art for making large quantities of low-cost high-surface-area nano-laminates with at least one hundred thousand continuous nanometer-thick layers per 1 cm of thickness of the laminate with each layer having continuous unbroken interfaces between different materials, such as metals, ceramics, semiconductors, or other materials. Not only can the instant invention achieve these goals, but it can do so in an economical, industrially-scalable manner.

SUMMARY OF THE INVENTION

This invention describes a class of materials that consist of a very large number of essentially parallel nano-layers with neighboring layers having a different composition or structure. The sheer density of such interfaces, up to hundreds of thousands per centimeter of thickness of the material, creates novel, highly-desirable properties to this nano-layered material, because the properties of these materials are controlled principally by the engineered interfaces themselves. This is in contrast to conventional nano-laminates in which it is the properties of the materials used to fabricate the layers themselves that are important.

In addition to these unique materials, this invention describes the novel fabrication methods and techniques needed to fabricate large surface area bulk structures in an economical, industrially-scalable manner. Taking the idea from the ancient method of forging of steel utilized in making of Japanese swords, one preferred embodiment of this invention uses a number of sequential steps to raise the number of layers to $2^n$—with "n" being the number of processing steps. Since $2^n$ increases exponentially, after just n=17 steps the number of layers is 131,072 per centimeter of thickness, with the thickness of an individual layer of the order of 100 nm.

Forging a monolithic material, like steel, requires that the material deform plastically at the processing temperature. Unfortunately, most ceramic materials and many metals are much too hard and brittle, even at very high temperatures (500-1200° C.) to allow such processing. In other words—they do not deform plastically, making forging impossible. The instant invention circumvents this problem by starting with nanophase powders instead of monoliths. The steps of this process include among others the layering of the pastes made from powders of different starting materials, followed by the rolling or pressing of the composite made of the stacked pastes (called greenware) to decrease its thickness. Subsequently, prior to the consolidation, the compressed and compacted greenware of the composite material is either folded on itself or is sectioned and then the sectioned pieces are stacked on one another. In the final step, the prepared greenware is consolidated either by rapid sintering, or, preferably, via rapid hot pressing, dynamic compaction, plastic deformation, or hot rolling. The degree of coherency of the interfaces in the thus fabricated nanolaminate is greatly affected by the final consolidation procedure, with temperature, pressure, and the time at temperature being the key processing parameters.

An additional concept of this invention is the unprecedented capability to incorporate additives into the engineered interfaces. During the greenware processing steps, the outside surfaces can be coated with liquids or powders, or other pastes can be added, which, in turn, are incorporated into the bulk of the material. Thus, a whole variety of graded materials and sequences of layers can be designed and formed in a very economical and industrially scalable manner. It should be noted that when employing nano-structured materials in any applications, there are two issues that must be addressed to make the application effective. First, a sufficiently high density must be achieved in order to realize the predicted beneficial properties. Second, the issue of thermal stability of the produced structures must be addressed, since any material that consists of nanoscale layers formed from consolidated nanosize particles contains very high energy associated with the enhanced area of interfaces. The approach outlined in this invention addresses both of these issues. This invention describes not only a method of manufacturing unique nano-structured materials that cannot be fabricated in other ways, but also teaches a novel approach for stabilizing these nanostructures even at extremely high temperatures via the judicious selection of component materials based on known phase diagrams.

That is, since the interfacial surface area of these structures is huge, from a naïve point of view it might be assumed that these structures are thermally-unstable. To eliminate any potential thermal instability, the material components are selected based on their high-temperature stability and absence of any liquid eutectics in the phase diagrams at the highest temperature of processing and service. In addition, the solid-state solubility is also controlled by pre-selecting the phases in such a way as to satisfy phase equilibrium of the thermodynamic phase diagrams that must be known or determined for each system.

Moreover, it should be noted that, if properly designed from the thermodynamic point of view, so that only phases with no- or limited-solid state solubility are present, the Interface-Defined Nano-Laminates of the instant invention can have a lot in common thermodynamically with spinodal structures found in nature. That is, these spinodal structures can have similar nanostructural interfacial features, and also are known to have remarkable phase stability at high temperature. From this discussion, it should be clear that not all attractive material combinations could be used as adjacent layers because of the thermodynamic stability requirement. The exact combination of the materials has to be deduced from corresponding phase diagrams to assure that the phases are stable at the temperatures required for processing and service. In fact, these artificially made nanostructures, if properly designed thermodynamically, should inherit a lot of stability features of spinodal structures, including thermal, chemical, and mechanical stability. It is known that spinodal structures greatly resist any kind of thermo-chemical changes because they are, at any given temperature, at kinetically-stable state. From the mechanical point of view, spinodals are usually highly resistant to crack nucleation and growth because, as all layered structures, they are susceptible to crack branching and crack-tip blunting. Accordingly, the Interface-Defined Nano-Laminates that are the subject of this invention are also expected to have significantly increased fracture toughness as represented in increased resistance to crack nucleation and crack propagation. All this should lead to greatly improved mechanical strength, flaw tolerance, and thermal shock resistance.

In the nano-structured materials produced via this invention, every interface between the materials is an interface between dissimilar materials. In contrast to the designed interfaces of the present invention, the interfaces in conventional single-phase materials with micron-sized grains are actually grain boundaries between misaligned small crystals of the same phase material.

Moreover, this invention enables one to achieve unique gains in high-temperature oxidation and reaction stability by taking advantage of the stabilizing forces of thermodynamic equilibrium that can be designed to operate on the nanometer scale, but lay entirely dormant in coarse-grain materials, whose microstructures are comprised of at least micron-sized features. From the fundamental point of view, it is necessary to maintain a state close to thermodynamic equilibrium between the adjacent dissimilar layers in the nanolayered material. The nanolayered structure would be in the thermodynamic equilibrium, if the change in Gibbs free energy with coarsening is greater than zero, $dG>0$. In other words, the driving force towards coarsening can be negated, thus making the nanolayered material thermally-stable, if dG>0 upon coarsening. The Gibbs free energy consists of enthalpic and entropic energy terms that have opposite signs:

$$G = H - TS, \quad (1)$$

or $$dG = dH - TdS \quad (2)$$

(dT=0, since temperature is constant.)

The enthalpy change term in (2), dH, is always negative with coarsening, thus driving the system towards increasing its feature size. However, the change of enthropy term, −TdS, is positive on coarsening, and can be made sufficiently large, to override the dH term and make dG>0, thus preventing the system from coarsening. This can be achieved by the judicious selection of the components of the nanolayered material, thus decreasing the Gibbs free energy of the nanolayered material to the point that any increase in feature size is thermodynamically unfavorable, and giving increased thermal stability to the nanosize material.

It is quite scientifically unexpected and fortuitous that the force driving the system towards equilibrium can be increased as the dimensions decrease by the careful selection of the components, which maximizes the entropy of the interface. That is, by utilizing the nanoscale layers, the number of interfaces, and, especially, the type of the interface between the dissimilar layers in the material, the disorder in the material is greatly increased, which in turn increases the entropy of the system. Subsequently, the thermal stability is increased because of decreasing Gibbs free energy (delta H-T delta S in equation (2). The novelty, uniqueness, and power of this approach, which we term "Entropic Stabilization" lies in activating the true capabilities of the nanoscopic structuring made possible by using the appropriate thermodynamic considerations that arise only in dissimilar nanostructured materials, and utilizing the unique processing approach outlined below to achieve such nanostructures in the bulk.

There are many unique aspects of the instant invention. One aspect of the uniqueness of the approach is in its capability of manufacturing large, bulk, quantities of materials at relatively low cost that currently are fabricated in small quantities by very expensive techniques. Another aspect of the uniqueness of this approach is in its ability to design, control, and optimize composition and properties of the interfaces, rather than the bulk of the nanophase grains.

Thus, the use of methods described in this invention, offers unprecedented opportunities in fabricating bulk quantities of materials that currently exist only as small research samples, because of the prohibitively expensive fabrication techniques.

DETAILED DESCRIPTION OF THE INVENTION

The instant invention describes Interface-Defined nano-Laminates, which are novel materials fabricated from metals and ceramics as well as other materials that have application in such diverse fields as, fast ion conductors, magnetostrictive materials, semiconductors, hydrogen storage materials, superconductors and environmental barrier materials. It also describes a low-cost method to fabricate large bulk quantities of these materials. In the description of this invention, the terms nano, nanoscopic, nanophase, nanoscale, nanosize, nano-grain and nanostructured will be used interchangeably to describe the materials of this invention.

This invention also provides the capability of manufacturing large (>0.1 sq. meter and preferably >1 sq. meter), bulk, quantities of these materials at relatively low-cost that currently are fabricated in small quantities by very expensive techniques, such as, PVD, laser ablation, magnetron sputtering, chemical vapor deposition, atomic layer deposition, as well as electro- and electroless deposition. An aspect of the uniqueness of this approach is in its ability to design, control, and optimize composition and properties of the interfaces, rather than the bulk of the nanophase grains.

The crux of this invention is to utilize the properties of interfaces, rather than the properties of the constituent materials within the layers of a nano-laminated material. This is similar to the use of nano-particles rather than traditional micron-sized particles in the fabrication of sintered metallic and ceramic parts. That is, as particles that are compacted and consolidated into a monolithic body become smaller, the portion of atoms that reside in the grain boundaries increases affecting the bulk properties of the body. In a similar manner, in the present invention, as the layers become thinner and more numerous, the influence of the interfaces eventually over-shadows the influence of the material in the individual nano-layers.

Interface-Defined nano-Laminates (IDnL) are materials which consist of at least 100, preferably more than 1000 and most preferably more than 100,000 continuous parallel layer planes of micron or preferably sub-micron thickness in which the neighboring layers have a different composition and/or structure. The individual layers are less than 5 microns thick, preferably less than 500 nm thick, and most preferably less than 100 nm thick.

The property-controlling parameters in these materials are the properties of the continuous essentially linear interfaces and the density of interfaces per unit of length through the thickness. IDnLs are designed by first deciding on the properties desired for an interface and the density of such interfaces. After these decisions the appropriate materials to achieve such properties are selected and the material can then be fabricated.

This invention also describes processes for the manufacture of these nano-laminates. These laminates with a very large number of thin laminate layers have not existed previously because there has not been an economical process that is able to fabricate them in large quantities with large surface areas. One preferred solution to this manufacturing problem was found by looking at historical methods for insights.

Since ancient times, Japanese samurai swords have been prized for their superior qualities in terms of hardness/toughness combination, which is expressed as the capability to cut through other swords, while at the same time being capable of bending into a circle. The remarkable processing technique that yields hundreds of thousands of iron carbide layers, parallel to the surface of the sword is responsible for these remarkable properties. The procedure consists of starting with a single slab of iron, carbonizing its surface, than cutting it in the middle, folding one piece on top of the other, and hammering everything back into the starting shape. When this procedure is repeated n times, it creates 2 to the n power of layers. If n=17, there are about 130,000 layers in a 1 cm—thick sword. By definition, the material of the sword is a nano-laminate with thickness of laminates of ~100 nm. In one preferred embodiment, the current invention takes the ancient multi-step process of sword-making to a new level to produce a novel family of materials—Interface-Defined-Nano-Laminates (IDnL), as described herein.

Although the principle idea for the process to fabricate the IDnL materials was inspired by the method for making Samurai swords, the exact procedure and the processing steps are not obvious to those skilled in the art of sword making. Moreover, whereas the Japanese sword making technique requires working with one material—steel, and carbonizing the surface of that steel, the novel method that is the subject of this invention deals principally with ceramic and metallic powders in the form of pastes with a viscosity capable of plastic deformation without losing the continuity and integrity of each individual layer. Even more important, the approach of the instant invention works with more than two materials, actually the processing can be carried out with two, three—any number of pastes of different powders, and includes the ability to incorporate additional pastes and surface coatings at any step in the processing procedure. These features make this invention distinct, very versatile, and not obvious to either those skilled in the art of making Japanese swords, or those skilled in the art of ceramic powder technology or powder metallurgy. (Actually, the processing steps of this invention are more akin to those involved in making fine French Croissants and German pastry, as more and more ingredients are incorporated by a skillful cook during the folding procedure.)

The procedures described in this invention offer remarkable flexibility in the design of nanolaminates of very complex structures, which may incorporate ceramics, metals, semiconductors and polymers to achieve the goals of the mechanical, physical, and chemical properties. The general steps in this process, which may be either a batch or continuous process, are given in Example 1.

EXAMPLE 1

Modeling

The first step in the process of fabricating an IDnL material is to make the decision on the type of interface properties this material should have. For example, if the projected material is a thermal insulator intended for exploitation at very high temperatures, the properties of the interfaces must include thermodynamic stability, or at least kinetic stability for specified duration at service temperatures. All mechanisms of heat transport must be taken into consideration: in this case phononic and photonic, and the reflection and transmission coefficients at the designed interfaces evaluated. Also, some estimates of the degree of coherency should be performed. After this $1^{st}$ step, the composition of the materials in the layers, the exact sequence of the dissimilar layers, the structure and chemistry of the interfaces, the thickness of each type of the alternating layers in the direction perpendicular to the plane of the layers, the density of layers per unit of thickness of the laminate, and many other parameters characterizing the exact structure of the nanolaminate material must be determined. One parameter that is not as important in the design of IDnL materials as in laminated materials with much thicker layers is the matching of the thermal expansion coefficients of the various constituents. This is due to the fact that the nanolayers are so thin that their individual thermal expansion produces little stress. All of the above is achieved via extensive computer modeling, and experimental studies of selected interfaces in bi-material junctions.

The remarkable flexibility of the approach and the sheer number of adjustable parameters makes it imperative that the material should be designed and modeled thoroughly prior to the actual fabrication. The IDnL materials are a new class of materials—these are "Materials—Structures" (rather than structural materials) and that's why intelligent engineering design of these materials-structures is so imperative. These IDnL materials can be thought of as the next step up from individual materials. Although they are not yet engineering structures that require the classical structural analysis, they are much too complex to be designed just on the hunch that normally guides a materials scientist when selecting a composition and microstructure needed to achieve some desired properties. The classic intuitive guess approach simply will not work well in the case of IDnL materials—only a thorough computer-assisted design of the interface atomic and microscopic structure and interfacial properties, as well as thermodynamic and kinetic stability will achieve this goal.

B. Constituents

The next step involves preparation of pastes and/or slurries from nanopowders consisting of nanosize particles of the materials selected in the previous step. Each paste or slurry that will ultimately form a nanolaminate layer, may comprise, metal, ceramic, alloy, or semiconductor particles as well as a mixture of these constituents. Although, laminates can be fabricated with particles in the micron and tens of micron range, for the instant invention it is desired to use particles of preferably less than 500 nm and most preferable less than 100 nanometers in size. The particle size is selected in such a way as to give continuity to the ultimate layer thickness formed by these particles. That is, the particles must be substantially (at least 3 times and preferably at least 10 times) smaller than the ultimate thickness of the resulting layer formed by these particles. If the particles are agglomerated, the agglomerates must first be broken up and refined by an appropriate technique, such as wet or dry grinding, attriting, milling, sonication, etc. The particles are preferably classified before use.

Some pastes or slurries can be made with an aqueous base, while other may require an organic or oil-base. If immiscible solvents are utilized for the different layers, this assures non-wetting characteristics during the forming process. Other non-wetting systems can be used as well. In addition to the solvent and the nano-particles, the paste or slurry also contains a binder, lubricants, and other additives as required, such as, dispersing agents and plasticizers as needed. The additives are adjusted by means well know in the art, such as the use of the Zeta Potential, so that the particles remain well dispersed in the solvent.

The viscosity is adjusted with the solvent for the required application. For application procedures, such as ink-jet deposition, silk screen printing, spraying, or use of a doctor blade, the viscosity of the slurry must be low enough to spray or spread evenly. Using pressing or rolling procedures, the required initial viscosity of the pastes is a function of the rate and extent of deformation, as well as of the processing temperature, and other important parameters. It is characterized and adjusted to stay within the region that satisfies the continuity requirement for the layers after the last step, which could be n=17, or close to it. It is important that it be possible to roll or press the paste without deforming it in a manner that intermixes the individual layers.

An interface additive is a material that is added to the surface of one or more of the at least two types of laminate layers of different composition that form the laminate. It can be added at any step of the laminate forming process and can have any thickness required for the properties of the laminate. That is, it can be thinner or thicker than the thickness of the at least two types of laminate layers. It can function as either an interface modifier or as an additional layer material between the other layer materials. Most additives are in the form of liquids, suspensions, emulsions, or pastes.

C. Procedure

For rolling, pressing, or wrapping, two or more different pastes of the appropriate composition and viscosity (similar to modeling clay) are placed in the starting sequence of layers. The thickness of the at least two different types of layers usually are but need not be equal to each other. The individual thickness and number of each type of layer in the starting stacked assembly depends upon the application. In one embodiment utilizing only rolling or pressing, it is preferable that the total thickness of all the starting layers be equal the total thickness of the desired product, although this also is not necessary. The assembled layers are then deformed and compressed by pressing or 1-dimensional rolling, for example, to decrease the thickness of the composite layer assembly while assuring that the layers remain parallel to each other without intermixing. The final thickness after each compression is usually one half of the original thickness, although it can be more or less than this value. The compressed green laminate or nanolaminate is then preferably cut in the middle and the resulting pieces are placed on top of each other in an orientation to insure that dissimilar layers are in contact with one another. It should be noted that the assembled layers can also be cut into three or more pieces of equal area that are subsequently stacked in the same manner. Alternatively, the assembled layers can be folded back on themselves. This is usually not as desirable as cutting because it is not possible to retain the sequence of dissimilar adjacent layers with folding. The deformation is then repeated. The ultimate number of the repeated sequences of, deforming, cutting, and stacking depends on the structure that is being developed. Each step usually doubles the density of layers in the same original thickness. At each step, it is possible to place additives on at least one of the exposed surface of the green laminate or nanolaminate to enhance or control properties. Thus, a non-wetting additive layer could be added between layers that wet each other to keep the interfaces distinct during processing or the additive could enhance some property of the final laminate. The additives can be added by techniques, such as, brushing, spraying, Doctor blade, Meyer bar, physical vapor deposition, chemical vapor deposition, or atomic layer deposition and their thickness can be greater, equal, or less than those of the at least two different laminate layer materials. At any stage of processing, the thickness of the additive layer relative to the thickness of the at least two types of individual layers is determined by the thickness of the applied additive layer as well as by the thickness of the at least two layers of different composition in the layered structure at the time when the additive layer is applied.

In another embodiment, instead of cutting and stacking the laminate or nanolaminate layered structure, at any point in the layer thickness reduction process, the laminate or nanolaminate material can be wrapped on a large mandrel to produce a laminate structure with many more layers than were wrapped onto the mandrel. Thus, if a large mandrel is used from the beginning of the process, the starting layer thickness of the at least two different materials can be very thin. When the desired number layers of laminate or nanolaminate are obtained, the material can be taken off the mandrel and then further rolled or pressed as desired.

In an additional embodiment, it is possible to start with lower viscosity slurries containing the same ingredients but having a higher concentration of solvent. This lower viscosity material can be utilized in other methods such as spraying, inkjet printing, and silk screen printing that are unable to produce the continuous nanometer thick layers that are required for this technique. These microlaminates are formed, for example, by spraying or spreading individual layers of material on a substrate one at a time. The substrate may be flat or in the form of a large diameter drum. The process utilizes in a successive, sequential deposition technique so that neighboring layers are comprised of materials of different composition. Each repeated pass over the substrate with materials different from the previous layer is preceded by at least a partial drying step before the deposition of the next individual layer. This drying step is needed to prevent the inter-mixing of adjacent layers and is accomplished from either the deposition side and/or the substrate side. After the desired total micro-laminate thickness is achieved, it can then be removed from the substrate. At this point either this material or this material stacked with other microlaminates, can be re-solvated to a paste like consistency, and then pressed or rolled to the final individual laminate layer thickness of less than 1 micron through single or multiple steps as described in the rolling and pressing procedure. Prior to the stacking of the micro-laminates, interface additives can be added to the surface or the outer surface layer might be converted by a process such as oxidation or carburization. In an alternative approach, the dried sprayed or spread material or this material stacked with other microlaminates, can be re-solvated to a paste like consistency, and then wrapped around a large mandrel to achieve the desired number of layers. After the desired number of layers is achieved, the material is removed from the mandrel and then pressed, or rolled to the final individual laminate layer thickness of less than 1 micron through single or multiple steps as described in the rolling and pressing procedure.

In some applications depending on paste composition and humidity control, rolling or pressing in combination with cutting and stacking can be utilized to make the desired nanolaminate. However, although rolling or pressing in combination with cutting and stacking are the principle techniques employed, these techniques alone are not usually able to reduce the laminate layer thickness to the nanometer scale without distortion of the interface between the layers. Thus, utilizing a vast variety of materials, these techniques in combination with spraying, spreading, and/or wrapping are usually employed with the final step being rolling or pressing.

After the cold compaction of the powder by pressing or rolling and prior to consolidation, the thus obtained "green" compact must be de-watered, de-gassed, and burned-out to remove all volatile components and other gaseous substances still attached to the surface of the particles. This is a normal step in the processing of powdered ceramic and metallic materials and involves the removal of the water, binders, lubricants, plasticizers, and other organic additives. The removal entails controlled-rate heating and holding procedures utilizing long intervals under vacuum (up to or exceeding 24 hours). The prolonged heating time is required due to the fact that the spaces between nanosize particles are of extremely small size, below 1 nm, which makes the process of degassing very slow.

The exact temperature/vacuum/holding time conditions depend on the properties of the volatile components, the particle size of the starting nanopowders, and the amount of porosity acceptable in the final product.

D. Consolidation

After this fabrication and compaction step, the green laminate or nanolaminate is consolidated or densified in such a way as to achieve uniformity and continuity of the structure, while at the same time minimizing grain growth of the two or more of different nanomaterials comprising the individual layers in the nanolaminates. Thus, consolidation must occur rapidly at as low a temperature as possible in order to avoid grain growth of the nano-sized powders. It is desired that the final density of the part equal 95% and preferably 99% of the theoretical density of the material. The theoretical density of a material is the density of the material without pores. This density is conventionally calculated using the unit cell volume, the material's chemical formula, and the number of formula units per unit cell.

This consolidation stage of nanolaminate fabrication consists of one or more of the techniques of reaction sintering, hot-pressing, hot rolling, dynamic compaction, liquid infiltration, or other densification method well-known in the art of sintering of metals and ceramics individually or in sequence, intended to yield fully-dense materials within the layers with various degree of coherency at the interfaces. These methods can also be aided by magnetic or electric fields in order to decrease time and temperature for the consolidation process and thus further reduce grain growth. In addition, microwave heating by itself can accomplish the goal of obtaining near theoretical density without appreciable grain growth. Each of these techniques is able to essentially fully consolidate the material and produce an incoherent or semi-coherent interface. However, it should be noted that the sintering process will cause some grain growth and the phases with either separate or dissolve in each other. Thus, to produce the coherent interfaces without grain growth that are required for some applications described below, a technique that utilizes Atomic Templating is required.

Atomic Templating utilizing magnetron sputtering is routinely employed to create materials that consist of interfaces that are atomically perfect. These interfaces yield all kinds of "Colossal" properties including super Young's modulus, colossal magnetic properties, and colossal oxygen conduction. These properties do not appear in nature because the materials are thermodynamically unstable and require sophisticated and complicated processing to produce them.

As stated above, magnetron sputtering is able to produce research-size samples, but the process requires expensive equipment and high vacuum. Thus, this technique is not able to produce industrial-size bulk samples at low cost. A new approach, such as Atomic Templating via Cold Consolidation (ATCC) is required to produce large bulk samples with atomically perfect interfaces at a small fraction of the cost. This technique consists of cold, elevated temperature, or explosive compaction of nano-coated nanoparticle at high-pressure (>0.3 GPa and preferably >1.0 GPa), which leads to densification via plastic deformation of the particles under pressure, rather than via the diffusion-assisted flow mechanism that would require higher temperatures. Thus, the elevated temperature must be high enough to enhance plastic deformation but not high enough for sintering.

The degree of coherency at the interfaces in the final consolidated nanolaminates could be affected greatly by the processing temperatures. A post-consolidation heat treatment may be added for some nanolaminates to develop the desired degree of coherency at the interfaces and to reduce or completely anneal out, (if so desired), stresses arising from the difference in thermal expansion coefficients of the materials comprising various layers in nanolaminate. (For some applications, such remnant interlayer stresses could be an advantage—arresting the tips of the propagating cracks.) The result of this annealing process at temperatures high enough to lead to atomic re-arrangement, yet low enough not to cause grain growth finishes the procedure and yields a fully-dense bulk material consisting of nanosize layers with atomically perfect coherent interfaces between them. Particle growth is eliminated so that growing particles do not disrupt the network of interfaces.

Because IDnL materials are able to comprise nano-, micro, and macro-structure, the nano-aspects of this structure must be designed to be stable at the temperature of use. In addition, the interfaces must be stable at those temperatures, that is, they should not produce eutectic reactions leading to the formation of liquid phases and they should resist inter-diffusion, diffusion bonding, and other high-temperature events that could destroy the structure of an IDnL material. In some applications, restricting grain growth within laminate layers might not be too important and in some cases is desired, depending on application. Although it is usually desirable to limit grain growth within the layers in order to take advantage of the nanophase materials, in certain applications it might be desirable to let the grains grow and to actually form single crystals within the layers.

For the stability of IDnL materials at high temperatures both the stability of the nano-layers or planes and the phase stability must be addressed. Both of these issues are well-known in the field of Materials Science and the methods for assuring stability of these materials even at the most extreme temperatures are known to those skilled in the art of extreme-temperature-capable structural materials. Only three methods will be mentioned here for illustrative purposes. The material in the planes can be seeded with larger crystallites allowing subsequent crystallization to take place within individual layers which assures coarse grain structure within the planes. To further assure stability, the composition of adjacent layers should be chosen from immiscible areas of phase diagrams and diffusion inhibitors should be used at the interfaces.

The procedures which are described in this invention offer remarkable flexibility in the design of nano-laminates of very complex structures, which may incorporate ceramics, metals, and semiconductors among other materials. The fact that it is possible to adjust the composition and structure of the materials that will form the layers, the exact sequence of dissimilar layers, the structure, chemistry, and sequences of the interfaces, density of layers, and many other considerations about the exact structure of the nano-laminate material allow one to precisely tailor the properties of the nanolaminate. Utilizing only ceramic layers in the laminates it is possible to increase the mechanical reliability, work of fracture, and toughness of ceramics by making laminate layers with weak interfaces which provide crack deflection. The ability to incorporate metal along with ceramic layers further enhances strength and ductility. A combination of high hardness of the internal layers combined with the built-in weakness of the interfaces and specially-selected density of interfaces will provide impact-resistance.

IDnL materials can also incorporate functional or smart properties. That is, due to their extreme flexibility in processing in which individual layer thickness and composition, as well as layer sequence can be controlled and varied, smart or functional layers can be inserted at will. For example, piezoelectric materials can be incorporated as layers. Metallic neighboring layers functioning as electrodes can achieve excellent coupling between the field and the active material. In addition, magnetic particulates, shaped as required, can form the layers, which under the action of an applied magnetic field, could drastically change the electrical and thermal conductivity of the IDNL material. In another application, the IDnL material can be made 'self-sensing' by incorporating into it a few layers that would detect the applied stress tensor, or structural damage.

Optical properties can be easily manipulated by a number of approaches, IDnL materials can be made transparent, or opaque to a certain range of wavelengths by an application of an electromagnetic field. In addition, IDnL materials can be made into an optical filter device that filters only some wavelengths. The wavelength of visible light is about 500 nm. That distance can be easily built into the laminate to allow for diffraction and interference effects. One application of this would be the use of this material to focus radiation only at certain angles (like in X-ray diffraction.)

EXAMPLE 2

Solid Electrolytes with Improved Ionic Conductivity

The use of IDnL materials is a very promising approach to generate a whole new family of Fast Ion Conducting materials that can be used as solid electrolytes in gas electrolyzers, electrochemical pumps, gas sensors, catalytic reactors, and most importantly in fuel cells. Production of energy from fuel cells utilizing ethanol, methanol, natural gas, coal products, etc. is of great national importance for use in transportation, stand-alone power, and residential power to name a few. Although this technology has broad application, such as in cation-conductors (lithium and sodium solid electrolytes), we will take as an example, oxygen ion conduction, for which the most commonly utilized solid electrolyte is yttria stabilized zirconia (YSZ). Although YSZ is the workhorse of the Oxygen Fuel Cell industry, the low oxygen conductivity at temperatures below 800° C. is the major problem causing huge inefficiencies due to the thermal losses and the material degradation at the high temperatures required. Lowering the operational temperature even by 100° C. would give a big boost to this industry.

It should be noted that there are a few experimental materials with better oxygen conductivity than YSZ, such as Gadolinia-doped Ceria and Lanthanum Gallates, however, they are not used industrially, either because of their thermal instability, electronic contribution to conductivity, or poisoning effects of sulfur, etc. In current oxygen fuel cells, YSZ is used in the shape of a cylinder with two streams of different gases, one along the interior and the other at the exterior of it. Normally, fuel, in the form of gasified coal or natural gas, is blown on the inside of the cylinder, and oxidizer, such as air, or pure oxygen, on the outside. The rate of movement of oxygen ions from the outside to the inside of this solid electrolyte cylinder, which depends on the conductivity of the material, is the key parameter for the efficiency and power output of such a fuel cell. YSZ has an oxygen conductivity of 0.1 S/cm at 1000° C. The smallest value of conductivity acceptable for the operation of the fuel cell is ten times lower i.e., 0.01 S/cm. Thus, if a lower-temperature oxygen conductor is to find industrial applications, its conductivity must be at least 0.01 S/cm.

The instant invention provides a novel approach and methodology for fabricating such a material, a solid electrolyte with oxygen conductivity greatly superior to that of YSZ, potentially exceeding room temperature (RT) conductivity of YSZ by 8 orders of magnitude. After optimization of processing, the novel material of this invention can have RT oxygen conductivity near 0.01 S/cm, which would make possible industrial development of room temperature oxygen fuel cell (if appropriate low-temperature catalysts become available). This invention also provides a novel approach to fabricate a cylinder from the material of choice in a simple and industrially scalable manner.

The background art for this invention is the fundamental discovery of Colossal Ionic Conductivity in Zirconia, stabilized with 8% yttria (YSZ), layered with strontium titanate and possessing coherent interfaces: [*Colossal Ionic Conductivity at Interfaces of Epitaxial $ZrO_2:Y_2O_3/SrTiO_3$ Heterostructures*, J. Garcia-Barriocanal, et al., Science 321, 676 (2008)]. In this fundamental work, the layered sample was made via Atomic Templating utilizing magnetron sputtering. The samples consisted of a multitude of parallel, extremely fine alternating layers, 1-62 nm thick (YSZ) and 10 nm—thick for SrTiO3 (STO). Because of the extremely fine features of these layers, the interfaces between the different layers acquire remarkably high oxygen-ion mobility. In this work, the oxygen conductivity along the $ZrO_2:Y_2O_3/SrTiO_3$ interfaces were found nearly 8 orders of magnitude greater than that of YSZ, at 84° C., when the thickness of YSZ layers was 1 nm. However, even when the thickness of YSZ was as large as 62 nm, the conductivity of the samples was still 3 orders of magnitude higher than that of YSZ. This groundbreaking result was attributed by the investigators to the coherent nature of the atomic interfaces that formed between the two phases during magnetron sputtering. These coherent interfaces, according to the authors, contained large numbers of vacancies and low-activation barrier sites for oxygen ions, thus creating a high-mobility environment for oxygen ions to move.

Although not stated by the authors, one plausible explanation for the $10^8$ enhancement in ionic mobility is that oxygen ions create a Lattice Gas structure in the thin film-like region of the interface. The lattice gas is best described by the (sing model. The phenomenal mobility arises because oxygen ions create a perfectly ordered superlattice, albeit with some defects. These defects move with phenomenal ease, because they assist each other and have very low activation energy of hopping. Thus, it follows that the thin interfacial film-like region must be atomically perfect—otherwise the effect disappears.

As stated above, to achieve these breakthrough results, Garcia-Barriocanal, et al. had to use magnetron sputtering in a high vacuum chamber to grow the epitaxial heterostructures. The huge drawback of this technology for industrial applications is that the deposition rate in a magnetron is very slow (on the order of nm/min), and only relatively small samples (<1 sq. ft.) can be produced. This makes the technique inherently very expensive and cumbersome to use for fabricating any shapes but extremely thin films. Making a cylindrical shape that is needed for fuel cell applications is not feasible with the magnetron technology. Thus, any industrial applications of this remarkable scientific breakthrough are impossible as long as magnetron sputtering is utilized for making the material.

In contrast to the magnetron layered approach, the Interface-Defined nano-laminate approach utilizes alternate thin laminate layers of the relevant material pair. Thus, the coherent or semi-coherent interface is formed in this application between adjacent layers in the nano-laminate. After a laminate with at least 10 layers, preferably 1000, and more preferably at least 100,000 layers is formed, it is then consolidated under high pressure (>0.3 GPa and preferably >1.0 GPa), at low temperature (i.e<0.5 of the melting temperature) with short holding times (measured in minutes and preferably seconds) to produce semi-coherent interfaces. This is preferably performed with dynamic compaction techniques, such as, with rapid pre-heating. in situ heating, adiabatic effects of compaction, microwave heating, or electric currents to achieve elevated temperatures. To obtain the highest-quality interfaces, the processing is optimized by varying pressure, temperature, and post-anneal combination until the best ionic mobility due to the improved coherency and continuity of the interfaces is obtained. High-temperature sintering can definitely not be employed since it would destroy the engineered interfaces either by dissolving them or as a result of grain growth. At these high pressures, the mechanism of consolidation of the material is fundamentally different from that of pressure-less sintering. The material densifies via plastic flow, rather than diffusion-assisted and viscous flow that is characteristic of high-temperature sintering. Because the highly-conductive interfaces will quickly dissolve at temperatures that are required for the diffusion and viscous flow, high-temperature sintering should not be used for fabricating dense nanostructured fast ion conductors.

After this stage, the density of the consolidated part should be above 95% of the full density of the material. As the particles deform and consolidate into a dense composite, a continuous network of YSZ/STO interfaces is formed. These interfaces are the sites for the rapid oxygen ion mobility. However, the coherency after the dynamic consolidation can be significantly improved by post-consolidation heat treatment.

After the dynamic consolidation, the material is post-heat treated to develop essentially perfect atomic coherence of the atomic interfaces, but without causing any grain-growth phenomena. The perfect coherency between YSZ and STO atomic lattices is essential for the colossal ionic conductivity observed in the fundamental work of J. Garcia-Barriocanal, et al. cited above. The cubic fluorite lattice of YSZ grows rotated 45° to c-axis of the perovskite structure of STO. The lattice constant of STO is 0.3905 nm and that of YSZ is 0.514 nm. As YSZ is rotated, it has to stretch, since $0.514/2^{1/2}=0.364$ nm is 7% too short to fit onto the 0.3905 lattice. This 7% strain leads to weakening of the bonds between ions, which lowers the activation energy of the ionic jump, which leads to greatly increase ionic mobility. Also, a large number of oxygen vacancies are generated at the interface. All of this illustrates the point that the interface must be coherent and atomically perfect. Just putting YSZ next to STO will not do the trick—the atomic rearrangement must take place and the coherent atomic planes must extend from one phase to another.

This last step accomplishes this requirement of coherency. After the dynamic consolidation, the interfaces are highly strained and cold-worked. Large numbers of dislocations present as non-equilibrium high-energy structures. A mild anneal at slightly elevated temperature (200-400° C.) allows for atomic re-arrangement to re-construct the atomically coherent interfaces, which are thermodynamically stable at low temperatures. These temperatures are too low to produce grain growth.

Estimation of Ionic Conductivity Prior to the Fabrication

As stated above, modeling is an important first step in the production of IDnL. This example shows the value of employing modeling to design a material dominated by interfaces. The calculation starts with tabulating the conductivity data for yttria-stabilized zirconia and the $SrTiO_3$—layered material from the above reference [Garcia-Barriocanal, et al. Table 1 has the tabulated data from the conductivity-temperature plot in the reference.

TABLE I

| Temperature (° C.) | Temperature (° K) | 1000/T (1/° K) | $ZrO_2$ Conductivity (S) σZr | $SrTiO_2$ interf. Conductivity (S) σI |
|---|---|---|---|---|
| 20 | 293 | 3.4 | $10^{-12}$ | $10^{-4}$ |
| 100 | 373 | 2.7 | $10^{-11}$ | $10^{-3}$ |
| 200 | 473 | 2.1 | $10^{-8}$ | $10^{-1}$ |
| 300 | 573 | 1.74 | $10^{-6}$ | 1 |
| 400 | 673 | 1.5 | $10^{-4}$ | |
| 700 | 973 | 1.03 | $10^{-2}$ | |

The goal is to obtain at lower temperatures the conductivity equal to that of yttria-stabilized zirconia at 700° C., which is $10^{-2}$ S, since this is the accepted value in industrial applications. This goal is achieved by incorporating highly-conducting interfaces via layering pure zirconia with $SrTiO_2$ material. The question is: "What should be the density of $SrTiO_2$ layers to achieve the necessary value of conductivity ($10^{-2}$ S) at lower temperature, say, 200° C.?"

The process starts with modeling the layered material as two resistors in parallel: (1) pure yttria-stabilized zirconia, and (2) $SrTiO_2$/zirconia interfaces. The thickness of the interfaces is taken from the plot as 30 nm, and the calculation is done in terms of resistances.

The total resistance of the layered material, $R_T$.

$$R_T = \frac{R_{Zr} \cdot R_I}{R_{Zr} + R_I} \quad (1)$$

where: $R_{Zr}$—resistance of zirconia and $R_I$—resistance of the interfaces.

For a sample of unit length and unit area:

$$R_T = \frac{1}{[(1-Nt)]\sigma_{Zr} + Nt\sigma_I} \quad (2)$$

In equation (2), N—is the density of interfaces per unit thickness of the laminate, σZr and σI are ionic conductivities of pure zirconia and the interfaces as defined in Table 1, and t is the thickness of one interface, t=30 nm.

The ratio of resistivities of pure zirconia material to the layered material can be found as:

$$\frac{R_T}{R_{Zr}} = \frac{1}{\left[(1-Nt) + Nt\frac{\sigma_I}{\sigma_{Zr}}\right]} \quad (3)$$

Equation (3) is the key equation for calculating the density of $SrTiO_2$ layers necessary to reduce the resistance of the layered material to the industrially-acceptable level indicated above. The value of $$\frac{\sigma_I}{\sigma_{Zr}}$$

for each temperature can be taken from the Table I.

From the Table I it is clear that at T=20° C. and 100° C. layering is of no use, since even the pure interfaces have conductivity below the goal of $10^{-2}$ S. However, at 200 C the conductivity of the interfaces is $10^{-1}$ S, thus layering can be used to achieve the industrial goal. At T=200° C., $$\frac{\sigma_{Zr}}{\sigma_I}$$

is equal to $10^{-7}$. Since $10,000=10^4$ layers per cm is industrially achievable via our layering routine, we take $N=10^4$, and arrive at conductivity of $0.3\times10^{-2}$, which is of the order of magnitude, yet slightly lower than the industrially desired $10^{-2}$ S.

However, at T=300° C., the layering approach works fine, as $$\frac{\sigma_{Zr}}{\sigma_I}$$

is equal to $10^{-6}$. Equation (3) then yields for $N=10^4$, $\sigma_T=3\times 10^{-2}$ S, which is three times the acceptable level of conductivity for fuel cells. Since the density of layers is equal to that of interfaces divided by 2, the total number of layers is equal 5,000/cm, which is easily achievable by the instant invention To summarize: At 300° C., the material consisting of 5,000 layers of $SrTiO_2$ in zirconia should have conductivity of $3\times 10^{-2}$ S, which is equal to that of pure yttria-stabilized zirconia at 700° C.

Similar calculations can be carried out at various temperatures to determine the ideal number of interfaces required at each temperature range of operation. For example, if the operating temperature of 400° C. would be needed, due to the catalyst requirements, the number of layers to achieve conductivity of $-10^{-2}$ S would be different from that at 300° C.

EXAMPLE 3

Novel Semiconductor Materials

Novel semiconducting materials that will play a major role in several new technologies such as nonlinear optics, luminescence, electronics, catalysis, solar energy conversion, and optoelectronics are amendable to manufacturing using the instant invention. It is well-known that the small dimensions of nanosize particles of semiconductors, such as CdS and CdSe, for example, result in different physical properties from those observed in the "bulk" material. However, manufacturing bulk pieces from these materials is complicated. Our approach, however, is naturally amenable to manufacturing large samples. In this example, the semiconducting material forms one laminate layer while thiophenol or another material, which allows for pressure-assisted consolidation and nano-assembly, forms the adjacent nano-laminate layer. The interfaces between the two different laminates layers can be designed to generate specific energy levels for electrons or holes, or even to act as donor/acceptor regions where electrons or holes are created or absorbed. Thus, the semiconductor layer acts as an intrinsic semiconductor, whereas the other laminate material acts as extrinsic semiconductor of either n- or p-type, or just provides additional energy levels.

Currently, the only approach to fabricating such a material is via nano-assembly, which is greatly limited in the type of materials that can be used for capping of the nanoparticles and is not nearly as flexible as the method of this invention.

EXAMPLE 4

Nano-Layered Magnetic Materials

In regards to novel magnetic materials, the Interface-Defined Nano-laminate approach is ideal for manufacturing bulk quantities of superior magnetic materials. This is accomplished by having thin nano-laminate layers stacked up in many layers and being separated by an interfacial material. This approach, by the virtue of protecting the size of starting nanoparticles in one direction by minimizing the laminate layer thickness, is an ideal method for manufacturing magnetic materials of low cost and extremely high coercivity.

It is well-known that nanoparticles of magnetic materials show unusual and highly desirable magnetic behaviors when compared to the bulk materials, due to the interface effects, such as symmetry breaking, electronic environment/charge transfer, and magnetic interactions [A. E. Berkowitz, M. F. Hansen, R. H. Kodama, Y. J. Tang, J. I. Hong, and David J. Smith, "Establishing exchange bias below $T_N$ with polycrystalline $Ni_{0.52}Co_{0.48}O/Co$ bilayers", Phys. Rev. B 72, 134428 (2005)]. For example, nearly spherical and magnetically hard Fe, Co, and Fe(Co)—B-based particles in the size of 7-20 nm possess an effective anisotropy and coercivity one to two orders of magnitude higher than in the bulk materials. [Shufeng Zhang, D. V. Dimitrov, G. C. Hadjipanayis, J. W. Cai, and C. L. Chien, "Coercivity Induced by Random-Field at Ferromagnetic and Antiferromagnetic Interfaces," J. Mag. Mag. Mater. 198-199, 468 (1999).] The highest coercivities are obtained in capped particles that have a core/shell morphology with a metallic core surrounded by a $(Fe_2O_3/Fe_3O_4$ (or berthollide) oxide shell consisting of small grains, which is exactly the technology of Interface-Controlled Materials, a co-pending invention. Theoretically, the large coercivities have been attributed to an exchange interaction between the core and shell moments at the interface, which can be easily modified and controlled by the Interface-Defined Laminate processing approach.

The surface/interface effects, as well as the intra- and inter-particle interactions on the magnetic properties of nanoparticles of rare earth metals and inter-metallic compounds with high anisotropy are expected to be of great importance to magnetic recording media, since the drive for higher density media requires isolated particles with size below 10 nm and coercivity greater than 3 kOe. Transition metals and their alloys have a low anisotropy and become super-paramagnetic below this size. It is thought that by controlling the magnetic properties of the interfacial regions (increasing the exchange interaction via incorporating magnetic oxides of Co) very useful magnetic materials for future magnetic recording can be produced.

EXAMPLE 5

Magnetostrictive Materials

The magnetostrictive phenomenon refers to the deformation of a material in a magnetic field. Advanced magnetostrictive materials have possessed great technological importance for many years. In 1975, the discovery of new magnetostrictive materials, for example, Terfenol-D ($Tb_{0.3}Dy_{0.7}Fe_2$), with enhanced performance and interesting physics renewed interest in magnetostriction.

In all applications, the system efficiency depends critically on the relative change in length (I=DI/I) as a function of the applied field. Values of DI/I on the order of $200\times 10^{-6}$ with a field smaller than 200 Oe are desired [R. C. O'Handley, S. J. Murray, M. Marioni, H. Nembach, and S. M. Allen "Phenomenology of Giant Magnetic-Field induced Strain in Ferromagnetic Shape Memory Materials", J. Appl. Phys. 87, 4712 (2000)]. However, this is not possible with existing materials, which require saturation fields of tens of kOe. Nanostructured materials are potential candidates that can lead to the desired properties through atomic engineering. Such properties can be obtained in amorphous or nanocrystalline alloys with reduced anisotropy and in multi-layers with alternate stacks of high magnetostrictive materials and soft magnetic materials that are exchange coupled. With the instant invention, samples with giant magnetostriction can thus be prepared. Some preliminary results on amorphous $Tb_{33}Fe_{67}/Fe_{80}B_{20}$ multilayers [R. C. O'Handley, S. J. Murray, M. Marioni, H. Nembach, and S. M. Allen "Phenomenology of Giant Magnetic-Field induced Strain in Ferromagnetic Shape Memory Materials", J. Appl. Phys. 87, 4712 (2000)] are clearly promising with high transverse magnetostriction of $600 \times 10^{-6}$ obtained in field around 2 kOe.

EXAMPLE 6

Hydrogen Storage Materials

The Interface-Defined Laminate approach outline above is ideally suitable for fabricating materials for hydrogen storage at ambient pressure and temperature. For this application, the capability of the Interface-Defined Laminate approach to fabricate mesoporous nanostructures in a highly controlled manner and hierarchically-ordered nanostructures is a key advantage.

Hydrogen storage materials by definition must have extremely high interfacial area to physisorb, chemisorb, or simply absorb the hydrogen molecule. Also, the ideal material must have extremely well-dispersed and interconnected porosity, in a way similar to the structure of human lungs. For the rapid, controllable release of hydrogen gas, the nanopores which contain hydrogen must be connected to larger pores and larger channels to allow for pressure control.

The Interface defined Nano-Laminate approach and the Interface-Controlled Materials approach, a method to fabricate high density materials from coated nano-particles which is described in a pending application, can be combined to produce such extremely complex hierarchical structures. Moreover, the chemistry of the interface that would accept the hydrogen material and the host material that would physisorb it can be easily varied to achieve the optimum properties. For this application, the preferred starting materials are LiH and other hydrides that have been shown to have high affinity for hydrogen. Also, activated carbon nanotubes, and various substoichiometric carbides capped with catalytic and protective metals and organics are ideally amenable for this approach.

EXAMPLE 7

Layered Superconductors

The Interface Defined nano-Laminate approach also has a great potential for scientific and engineering breakthroughs in superconducting materials, especially considering the recent discoveries of high-$T_c$ at interfaces of thin films [A. Gozar, G. Logvenov, L. Fitting Kourkoutis, A. T. Bollinger, L. A. Giannuzzi, D. A. Muller & I. Bozovic, High-temperature interface superconductivity between metallic and insulating copper oxides, *Nature* 455, 782-785 (9 Oct. 2008)]. The discovery of high-$T_c$ superconductivity confined to nanometer-sized interfaces can lead to a numerous potential applications. This discovery provides a great opportunity for manufacturing superconducting materials in the bulk quantities via a nanolamination-type approach.

In essence, in normal metals this interface phenomenon is suppressed, because the high electron density limits interface effects (such as carrier depletion or accumulation) to a region much narrower than the coherence length, which is the scale necessary for superconductivity to occur. By contrast, in the high-Tc 1-2-3 copper oxides, the carrier density is low, whereas $T_c$ is high and the coherence length is very short, which demands that interfaces must be perfectly coherent and atomically flat. However, the recently discovered superconductivity in bilayers consisting of an insulator ($La_2CuO_4$) and a metal ($La_{1.55}Sr_{0.45}CuO_4$), neither of which is superconducting in isolation, does not require perfect interface coherence and is highly robust. The $T_c$ exceeds 50 K; this enhanced superconductivity is shown to originate from an interface layer about 1-2 unit cells thick. In summary, enhancement of $T_c$ in bilayer systems has been observed before, however, the role of the interfaces has never been fully recognized and a low-cost manufacturing technique has not existed to fabricate industrial-sized samples.

EXAMPLE 8

Additional Applications

To this point, the discussion has centered on the use of manufacturing techniques, comprising any combination of pressing, wrapping, or rolling in conjunction with cutting and stacking or folding as well as a form of spreading or spraying, in order to produce IDnL with very special properties that are determined by a vast number of interfaces. It is clear that the IDNL technique can produce new structures. Because these techniques employ simple processes to produce the initial green-ware plate, and subsequent rolling, pressing steps as well as spreading or spraying are also standard simple industrial processes, no large upfront capital expenditures are needed, and operating costs are low. The technique is also eminently scalable, further reducing costs.

The same manufacturing techniques employed to manufacture IDnL structures can be used with one or more additional steps to produce other materials. That is, for example, the fabrication of individual discrete thin layers of various materials, such as, for example, polycrystalline silicon for photocells can utilize similar processing steps. By careful selection of the materials contained in one or more of the initial green-ware layers, or of the choice of additive and/or processing operations employed between rolling, spraying, spreading, wrapping, and/or pressing steps, the integrity of the final composite can be diminished to the point where it can be separated into one or more individual thin layers. Thus, the final product is no longer a layered composite with as many layers as practical, but a collection of individual discrete or small groups of layers whose thicknesses are controlled by the thicknesses of the original layers as well as the number of rolling and/or pressing steps "n". If n is on the order of 5, and the thickness of an initial green-ware layers is 1 millimeter, the thickness of the final discrete layers will be approximately 30 microns ($2^5$=32 and 1 millimeter/32=31.25 microns). This is an acceptable thickness for a photovoltaic solar cell. Thus, for example greenware can be laid-up with 1-millimeter thick paste composed of nanometer or micron-sized silicon particles in a binder with additional additives. This greenware is placed on a substrate plate coated with a de-bonding agent. After 5 rolling and/or pressing steps each incorporating re-application of the de-bonding agent, 32 silicon layers each approximately 30 microns thick will be formed. In this rolling process, the sample is rolled or pressed to half its original thickness, cut in half, one half coated with de-bonding agent, and the other half stacked on the first half in such a way as to maintain debonding agent between each layer. Alternatively, instead of employing a de-bonding agent between each layer as they are stacked it is possible to utilize a de-bonding agent or sacrificial material as the second layer in the starting material.

After the fifth rolling and/or pressing step, a heat treatment would be carried out to create the dense polycrystalline silicon layer as well as to possibly remove the de-bonding agent or sacrificial material. Assuming a rolling process is employed, very long photocells could be produced whose width and length could be controlled by the size of the rollers and the length of the feed and take-up tables or belts. Conceivably, very large crystallites can be grown, especially if "seed" silicon crystals are incorporated into the initial silicon paste along with the silicon particles that are preferably elongated or needle shaped with an aspect ratio of at least 5 and preferably at least 10 as well as a minimum dimension equal to the final thickness of the layer or less. Once the crystallization heat treatment is concluded, the discrete layers can be separated into alternating sheets of silicon. However, it is preferable to separate the sheets before they are fully heat treated and crystallized. The silicon layers could then be attached to a supporting layer such as glass or polymer.

Alternatively, a greenware layer of photo cell backing material could be co-processed with the 1 mm silicon layer. The initial thickness of the backing material being determined by the final thickness needed for mechanical strength. A de-bonding agent could be applied to the top of the initial silicon-paste layer as well as to the top of each silicon-paste layer before it is cut or folded and placed on top of the other stacked assembly during each subsequent rolling and/or pressing step. This would produce 32 discrete layers of crystallized silicon attached to the backing material after 5 rolling and/or pressing steps each incorporating re-application of the de-bonding agent. The properties of the backing layer are selected to survive processing of the silicon as well as to optimize the performance of the photovoltaic silicon layer.

A final adaptation of this individual layer concept is the elimination of the de-bonding agent entirely. It can be replaced with a sacrificial layer that is removed by suitable means after the crystallization heat treatment. These means could include, but not be limited to, solvation, etching, oxidation, other chemical or physical process, as well as longitudinal slicing along direction of the layers, or a combination thereof. This adaptation may have the added benefit of maintaining the integrity of the layered composite during the rolling and/or pressing operations. Conceivably, use of a de-bonding agent could lead to layer separation during or after one of the rolling and/or pressing steps. This would greatly complicate subsequent processing steps.

The multiple rolling or pressing process utilized in the present invention produces thin layers of material that have advantages over thin layers of material produced as single layers. Since these layers are constrained in the multiple rolling process by another material on each face and they are rolled or pressed multiple times, the thin layers should be more uniform in thickness and composition, have lower roughness, and larger grain size as they are constrained to grow in only two directions.

EXAMPLE 9

Smart Materials

By incorporating electrostrictive or magnetic particles or layers, these novel materials can be made 'smart' and allow electronic manipulation of these properties. By using single crystal seed particles, the different neighboring layers can be converted into 2-dimensional single crystals, by a plane-limited crystal-growth method. Thus, the material can be made into radiation-filtering devices, in which some wavelengths are filtered out, or focused in selected directions in a manner similar to X-ray diffraction. This property can be made tunable by placing a smart material in alternative layers or non-sequential layers. In addition, this same technology can be used to make thin layers of energy-producing material, such as used in solar cells with or without a backing material.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. A batch or continuous process for fabricating a low porosity nanolaminate material comprising at least two continuous individual layers comprising at least two different nanomaterials, wherein adjacent layers each have a different nanomaterial composition, the continuous individual layers being numerous enough and thin enough such that at least one property of the low porosity nanolaminate material is mainly determined by an unbroken continuous interface between the adjacent layers and to a lesser degree by properties of the different nanomaterial composition comprising the continuous individual layers, the batch or continuous process comprising the steps of:

a) selecting the different nanomaterial composition for each continuous individual layer, a sequence of the continuous individual layers, a structure and a chemistry of each unbroken continuous interface between each continuous individual layer, and a desired final layer thickness of each of the continuous individual layers in a direction about perpendicular to a plane of the continuous individual layers, wherein the desired final layer thickness is 1-999 nanometers;
   b) selecting at least two nanopowders each consisting of nanosize particles of different composition;
   c) refining and classifying the at least two nanopowders such that that the nanosize particles are at least 3-10 times smaller than the desired final layer thickness of each continuous individual layer;
   d) forming at least two pastes or slurries by adding a solvent and at least one additive selected from the group consisting of a binder, a lubricant, a dispersing agent, a stabilizer, and a plasticizer to the at least two nanopowders, wherein each paste or slurry each comprises one of the at least two nanopowders;
   e) adjusting a viscosity of each paste or slurry such that low viscosity slurries are capable of being sprayed or spread and such that higher viscosity pastes are capable of being rolled, pressed, or wrapped around a mandrel without deforming in a manner that intermixes the adjacent layers;
   f) fabricating a green nanolaminate from the at least two pastes or slurries by at least one process selected from the group consisting of spraying, spreading, wrapping, rolling, pressing, cutting, and stacking;
   g) repeating the at least one fabrication process until at least one of a desired number of continuous individual layers and the desired final layer thickness of each of the continuous individual layers is obtained;
   h) compacting the green nanolaminate utilizing an additional rolling sequence or an additional pressing sequence;
   i) de-watering, de-gassing, and burning out the green nanolaminate prior to consolidation to remove volatile components;
   j) consolidating the green nanolaminate to form the low porosity nanolaminate material having a desired final thickness utilizing at least one technique selected from the group consisting of atomic templating via cold consolidation, rapid sintering, hot pressing, dynamic compaction, plastic deformation, liquid infiltration, microwave heating, and hot rolling, wherein the green nanolaminate is consolidated to a density that is at least 95% of theoretical density while minimizing porosity and grain growth of the at least two different nanomaterials such that unbroken continuous interfaces are formed between the adjacent layers; and k) annealing the low porosity nanolaminate material at an elevated temperature sufficient to cause atomic rearrangement such that a desired degree of coherency at the unbroken continuous interfaces is developed.

2. The batch or continuous process for fabricating a low porosity nanolaminate material of claim 1 wherein the desired final layer thickness of each of the continuous individual layers is 1-100 nanometers.

3. The batch or continuous process for fabricating a low porosity nanolaminate material of claim 1 wherein the low porosity nanolaminate material comprises at least 100 continuous individual layers.

4. The batch or continuous process for fabricating a low porosity nanolaminate material of claim 1 wherein the at least two nanopowders are selected from the group consisting of metallic, ceramic, and semi-conductors.

5. The batch or continuous process for fabricating a low porosity nanolaminate material of claim 1 wherein the solvent is selected from the group consisting of water, oil, and an organic solvent.

6. The batch or continuous process for fabricating a low porosity nanolaminate material of claim 1 wherein each unbroken continuous interface of the low porosity nanolaminate material has a cross-sectional area of at least about 0.1 square meter.

7. The batch or continuous process for fabricating a low porosity nanolaminate material of claim 1 further comprising spraying or spreading each low viscosity slurry onto a substrate until at least one of the desired final layer thickness for each continuous individual layer and a desired total thickness of the green nanolaminate is obtained.

8. The batch or continuous process for fabricating a low porosity nanolaminate material of claim 7 wherein each low viscosity slurry is sprayed or spread in a successive, sequential deposition manner such that adjacent layers are comprised of different nanomaterials.

9. The batch or continuous process for fabricating a low porosity nanolaminate material of claim 8 further comprising allowing each continuous individual layer to dry prior to spraying or spreading the adjacent layer such that intermixing of adjacent layers does not occur during subsequent steps.

10. The batch or continuous process for fabricating a low porosity nanolaminate material of claim 8 further comprising repeating the spraying or spreading process until the desired number of continuous individual layers is achieved.

11. The batch or continuous process for fabricating a low porosity nanolaminate material of claim 10 further comprising adjusting a solvent content of the continuous individual layers prior to compacting the green nanolaminate.

12. The batch or continuous process for fabricating a low porosity nanolaminate material of claim 1 further comprising:

forming a green laminate comprising at least two continuous individual layers of paste each comprising a different nanopowder;

reducing an original thickness of the green laminate by rolling or pressing to form a compressed green laminate;

cutting the compressed green laminate into a first half and a second half, wherein the compressed green laminate is cut in the direction about perpendicular to the plane of the continuous individual layers, the first half and the second half being about equal in area;

stacking the first half on top of the second half to form a stacked green laminate, wherein the first half and the second half are stacked such that adjacent layers comprise different nanomaterials;

rolling or pressing the stacked green laminate; and repeating the steps of cutting, stacking, and rolling or pressing until at least one of the desired number of continuous individual layers and the desired final layer thickness of each of the continuous individual layers is obtained.

13. The batch or continuous process for fabricating a low porosity nanolaminate material of claim 12 wherein a total thickness of the green laminate is about equal to the desired final thickness of the low porosity nanolaminate material and wherein rolling or pressing reduces the original thickness by about half.

14. The batch or continuous process for fabricating a low porosity nanolaminate material of claim 12 further comprising applying at least one interface additive to at least one exposed surface of the green laminate prior to stacking.

15. The batch or continuous process for fabricating a low porosity nanolaminate material of claim 1 wherein the consolidation step is assisted by an electric or magnetic field, wherein the electric or magnetic field decreases at least one of a consolidation time and a consolidation temperature.

16. The batch or continuous process for fabricating a low porosity nanolaminate material of claim 1 wherein the annealing step further reduces stresses arising from a difference in thermal expansion coefficients of the different nanomaterials comprising the continuous individual layers.

17. The batch or continuous process for fabricating a low porosity nanolaminate material of claim 1 wherein the low porosity nanolaminate material is a fast ion conducting material suitable for use as a solid electrolyte in at least one of gas electrolyzers, electrochemical pumps, gas sensors, catalytic reactors, and fuel cells.

18. The batch or continuous process for fabricating a low porosity nanolaminate material of claim 1 wherein said low porosity nanolaminate material is thermally stable due to entropic stabilization.

19. The batch or continuous process for fabricating a low porosity nanolaminate material of claim 1 wherein the at least two nanopowders are selected from the group consisting of 8% yttria-stabilized zirconia and strontium titanate.

20. The batch or continuous process for fabricating a low porosity nanolaminate material of claim 1 wherein the unbroken continuous interfaces between each continuous individual layer have an enhanced conductivity as compared to the at least two different nanomaterials comprising the adjacent layers.

* * * * *